(12) United States Patent
Agehara et al.

(10) Patent No.: US 7,858,219 B2
(45) Date of Patent: Dec. 28, 2010

(54) LOCKING MECHANISM OF BATTERY PACK

(75) Inventors: Kigen Agehara, Tokyo (JP); Michio Yamashita, Tokyo (JP)

(73) Assignee: Max Co., Ltd., Tokyo (JP)

( * ) Notice: Subject to any disclaimer, the term of this patent is extended or adjusted under 35 U.S.C. 154(b) by 0 days.

(21) Appl. No.: 12/160,219

(22) PCT Filed: Jan. 11, 2007

(86) PCT No.: PCT/JP2007/050254
§ 371 (c)(1),
(2), (4) Date: Jul. 8, 2008

(87) PCT Pub. No.: WO2007/080928
PCT Pub. Date: Jul. 19, 2007

(65) Prior Publication Data
US 2009/0011325 A1    Jan. 8, 2009

(30) Foreign Application Priority Data
Jan. 12, 2006    (JP) .............................. 2006-004851

(51) Int. Cl.
*H01M 2/10* (2006.01)
*B23B 51/00* (2006.01)
*B23B 21/00* (2006.01)
*B23Q 5/04* (2006.01)
(52) U.S. Cl. ........................... 429/97; 429/100; 30/500; 173/13
(58) Field of Classification Search .................. 429/96, 429/97, 98, 99, 100; 173/217
See application file for complete search history.

(56) References Cited

U.S. PATENT DOCUMENTS
5,792,573 A * 8/1998 Pitzen et al. ................... 429/97

(Continued)

FOREIGN PATENT DOCUMENTS
DE    40 34 678 A1    5/1991

(Continued)

OTHER PUBLICATIONS
Machine translation of JP 2001-155700, Shibata et al., Jun. 2001.*

*Primary Examiner*—Jonathan Crepeau
*Assistant Examiner*—Kenneth Douyette
(74) *Attorney, Agent, or Firm*—Drinker Biddle & Reath LLP

(57) ABSTRACT

A locking mechanism of a battery pack A is provided with a hook 14 which can be locked to a mounting part B of an object equipment such as an electric tool in a state slid with respect to the mounting part, and operation parts 16 for releasing the lock which are linked to the hook 14, on a case which contains a battery. The hook 14 is urged to move upward by an elastic body in a direction of being locked to the mounting part B.

The operation parts 16 are arranged in both side parts of the case within such a range that they can be grasped with a single hand from both sides of a backward end in the sliding direction of the case. When the operation parts 16 are operated from the both sides, the lock between the hook 14 and the mounting part B is released against the urge by the elastic body.

2 Claims, 6 Drawing Sheets

U.S. PATENT DOCUMENTS

| | | | |
|---|---|---|---|
| 6,376,942 B1 * | 4/2002 | Burger et al. | 310/47 |
| 2004/0070367 A1 | 4/2004 | Schadoffsky et al. | |
| 2005/0058890 A1 * | 3/2005 | Brazell et al. | 429/99 |

FOREIGN PATENT DOCUMENTS

| | | |
|---|---|---|
| DE | 199 05 086 A1 | 8/2000 |
| EP | 0 716 461 A1 | 6/1996 |
| JP | 2001-155700 | 6/2001 |
| JP | 2001-229895 | 8/2001 |
| JP | 2002-260619 | 9/2002 |
| JP | 2004-039638 | 2/2004 |

* cited by examiner

LOCKING MECHANISM OF BATTERY PACK

TECHNICAL FIELD

The present invention relates to a locking mechanism of a battery pack, as a power supply for an electric tool and so on, which is attachable to and detachable from an object equipment such as the electric tool and a battery charger.

BACKGROUND ART

Generally, the battery pack of this type is attachable to and detachable from a grip part of an electric tool or a battery charger, and is so constructed that when the battery pack has been attached, positive and negative terminals of the battery pack are brought into contact with terminals provided on the object equipment such as the electric tool, the battery charger, and so on.

By the way, as disclosed in JP-A-2001-229895, there has been known a conventional attaching structure of the battery pack which is so constructed that a hook is provided in a rear part of the battery park, and locking means to be locked to and unlocked from a receiving part of the electric tool is linked to the hook. Attaching of the battery pack is performed by sliding the battery pack forward toward a determined position of the object equipment to push it in, and by locking the locking means to the receiving part of the object equipment. On the other hand, detaching of the battery pack can be performed by pushing the hook on the back face downward with fingers to release the locked state of the locking means, and thereafter, by withdrawing the battery pack backward.

Besides, as disclosed JP-A-2004-039638, there has been known another conventional attaching structure of a battery pack which is so constructed that a pair of operation parts are provided at both sides of the battery pack, and detaching of the battery pack can be performed by pressing the operation parts with a thumb and an index finger of a single hand so as to clamp them from below thereby to release the lock between the battery pack and the object equipment such as the electric tool.

However, in the structure as disclosed in JP-A-2001-229895, when the battery pack is removed, a direction of a force to be applied for releasing the lock of the hook (a downward direction) and a direction in which the battery pack is withdrawn (a backward direction) are different from each other, and it is difficult to apply appropriate amounts of the forces. Because the force in the downward direction for releasing the lock is still maintained after the lock has been released, there has been such a problem that the battery pack cannot be retained when it has been detached from the object equipment, and the battery pack may be dropped and broken.

Moreover, in the structure as disclosed in JP-A-2004-039638, recesses are formed in a vertical direction on both side faces of the battery pack below the operating parts, and the battery pack is withdrawn in a state where the thumb and the index finger are inserted into the recesses from below. Because the battery pack is horizontally withdrawn with the thumb and the index finger directed upward and downward, it has been impossible to use the forces efficiently. Moreover, there has been such a risk that the fingers may be disengaged from the recesses with the force for withdrawing, and the battery pack may be dropped. There has been a further problem that it is difficult to obtain sufficient strength against an impact at a time of dropping, because a large locking member cannot be provided in view of a space.

DISCLOSURE OF THE INVENTION

One or more embodiments of the invention provide a locking mechanism of a battery pack which can be easily handled, and can reliably attach and detach the battery pack to and from an object equipment such as an electric tool and a battery charger, and in which sufficient strength against an impart of dropping or so can be obtained.

In a first aspect of the invention, there is provided a locking mechanism of a battery pack provided with a hook on a case which contains a battery and is attachable to and detachable from an object equipment by sliding, the hook being lockable to a mounting part of the object equipment, and operation parts linked to the hook for releasing the lock, wherein the mounting part is provided on a bottom face of the object equipment, while the hook is provided on an upper face of the battery pack, the hook is urged to move upward by an elastic body in a direction of being locked to the mounting part, the operation parts are arranged in both side parts of the case within such a range that they can be grasped with a single hand from both sides of a backward end in a sliding direction of the case, and the operation parts are operated from both sides, whereby the lock between the hook and the mounting part is released against the urge by the elastic body.

Moreover, in a second aspect of the invention, the hook is arranged on un upper face of the battery pack so as to move in a vertical direction, a first slanted face is formed on the hook at a front face in the sliding direction and can be engaged with the mounting part of the object equipment, second slanted faces are formed on both sides of the hook at positions corresponding to the operating parts, whereby when the operation parts are engaged with the second slanted faces to push the second slanted faces, the hook moves downward thereby to release the lock between the hook and the mounting part.

According to the first aspect, during attaching the battery pack to the object equipment, the hook is locked to the object equipment and fixed, by sliding it with respect to the mounting part.

On the other hand, during detaching the battery pack, it is possible to withdraw it by sliding, after the operation parts are operated from both sides to release the lock with respect to the hook.

The operation parts are arranged in both side parts of the case within such a range that they can be grasped with a single hand from both sides of a backward end in the sliding direction of the case. Therefore, when the battery pack is to be detached, the case is rigidly clamped with the single hand, which is an act of rigidly holding the case in the single hand, at the same time. In this manner, releasing the lock of the hook and rigidly grasping the case for withdrawal are the same action, and therefore, it is possible to easily and reliably withdraw the battery pack from the object equipment. Accordingly, the battery pack can be easily handled.

Moreover, because the hook is arranged on the upper face of the case, there is a sufficient space for installing the large-sized hook. Accordingly, it is possible to take sufficient strength against an impact of dropping.

According to the second aspect, when the battery pack is to be attached to the object equipment, the first slanted face which is formed on the front face in the sliding direction of the hook is engaged with the mounting part of the object equipment by sliding the battery pack with respect to the mounting part, and the hook moves in a vertical direction with respect to the mounting part by sliding, whereby the hook is locked to the mounting part and fixed.

On the other hand, when the battery pack is to be detached, the hook is moved downward by operating the operation parts from both sides to allow the operation parts to be engaged with the second slanted faces so that the second slanted faces are pushed in, whereby the lock of the hook to the mounting part is released. Thereafter, the battery pack may be slid to be withdrawn.

Other aspects and advantages of the invention will be apparent from the following description, the drawings and the claims.

DESCRIPTION OF THE REFERENCE NUMERALS AND SIGNS

Figure 1:
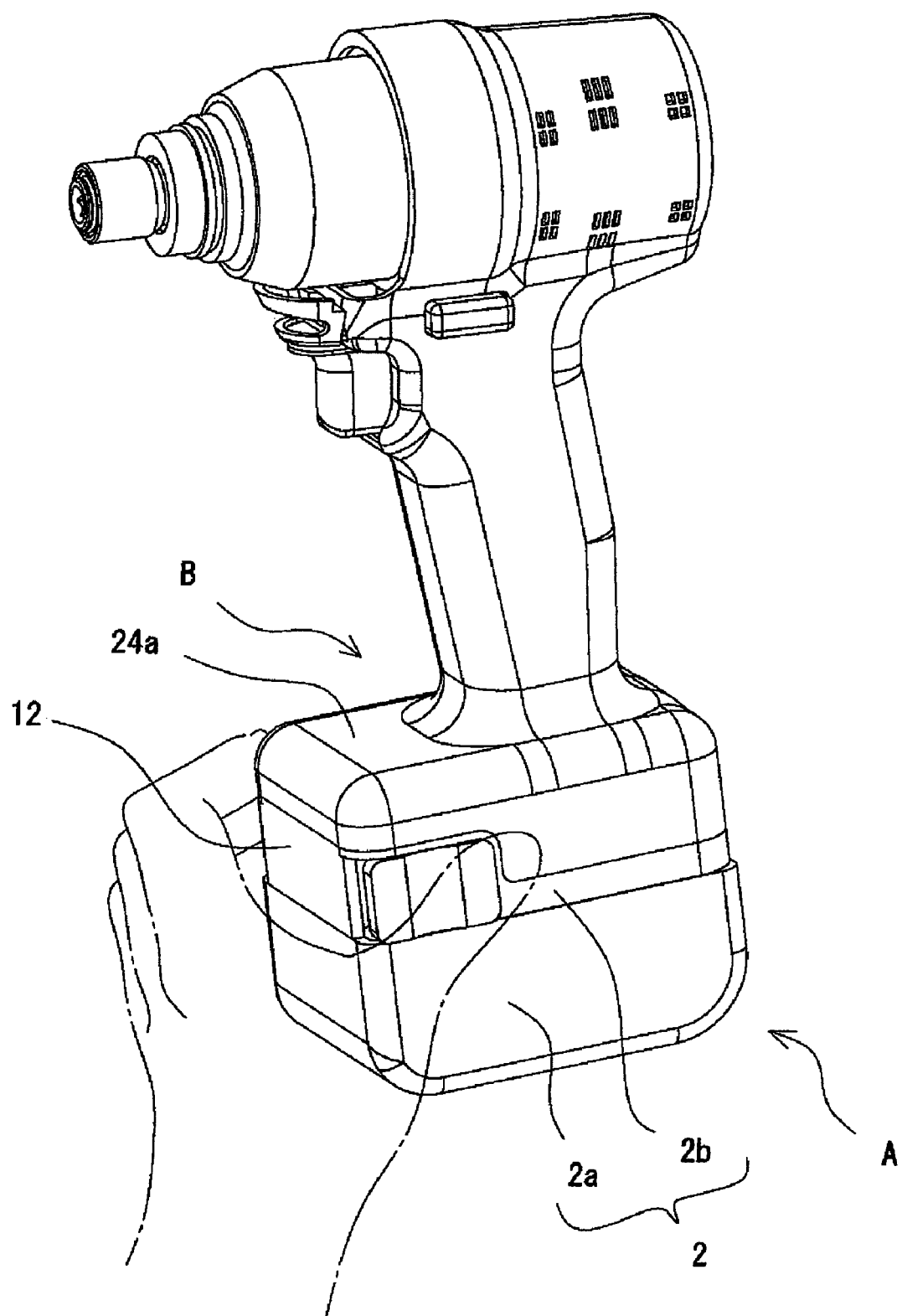
FIG. 1 is a perspective view of a battery pack in a exemplary embodiment of the invention in a state where the battery pack is attached to an electric tool.

A Battery pack
B Mounting part of an electric tool
2 Outer case
3 Inner case
14 Hook
15a Slanted face
15b Slanted face
16 Operation part
17 Spring receiving part
18 Locking jaw
19 Recess

BEST MODE FOR CARRYING OUT THE INVENTION

An exemplary embodiment of the invention will be described referring to the drawings.

Figure 2:
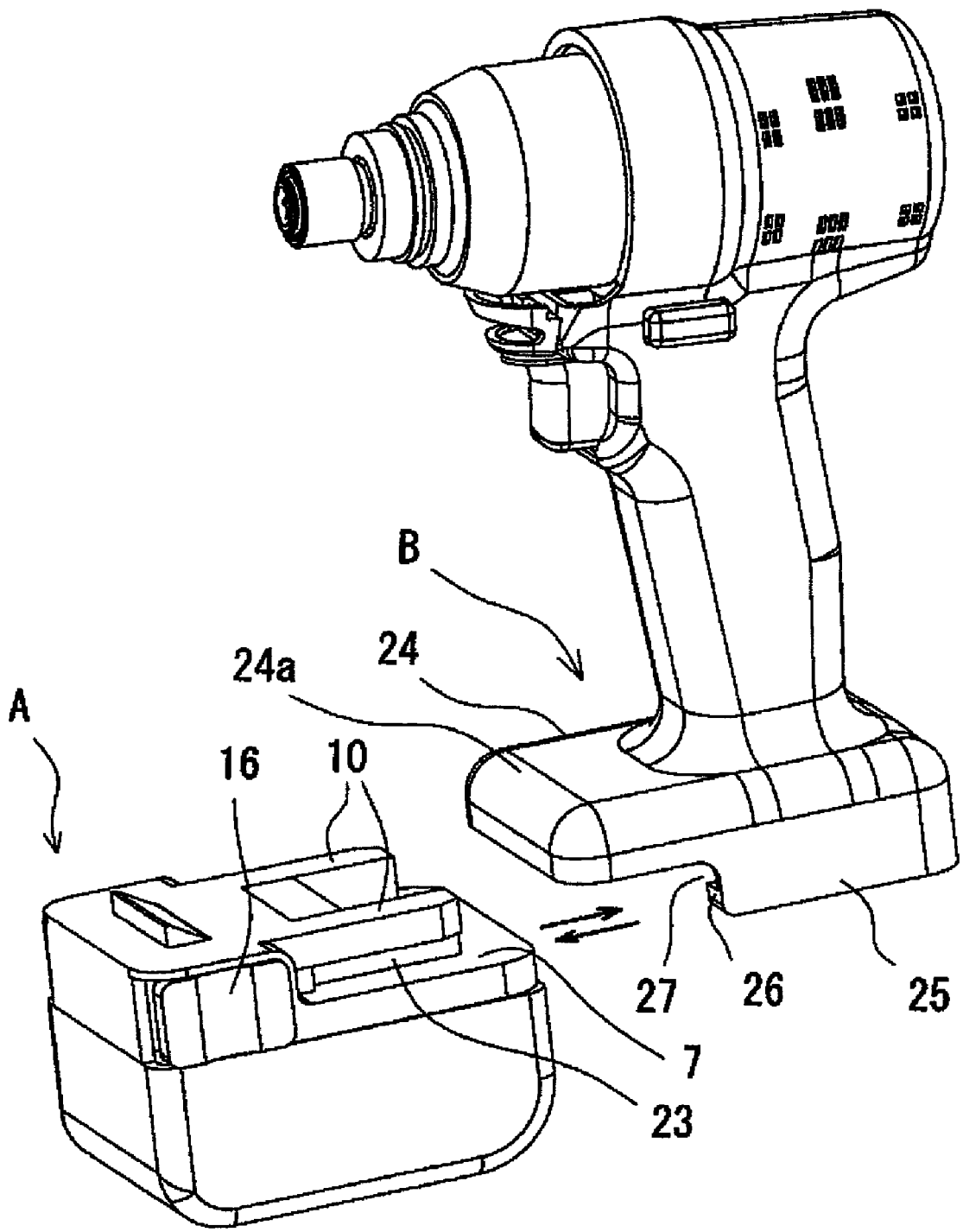
FIG. 2 is a perspective view of the battery pack in the exemplary embodiment of the invention in a state before the battery pack is attached to the electric tool.
Figure 3:
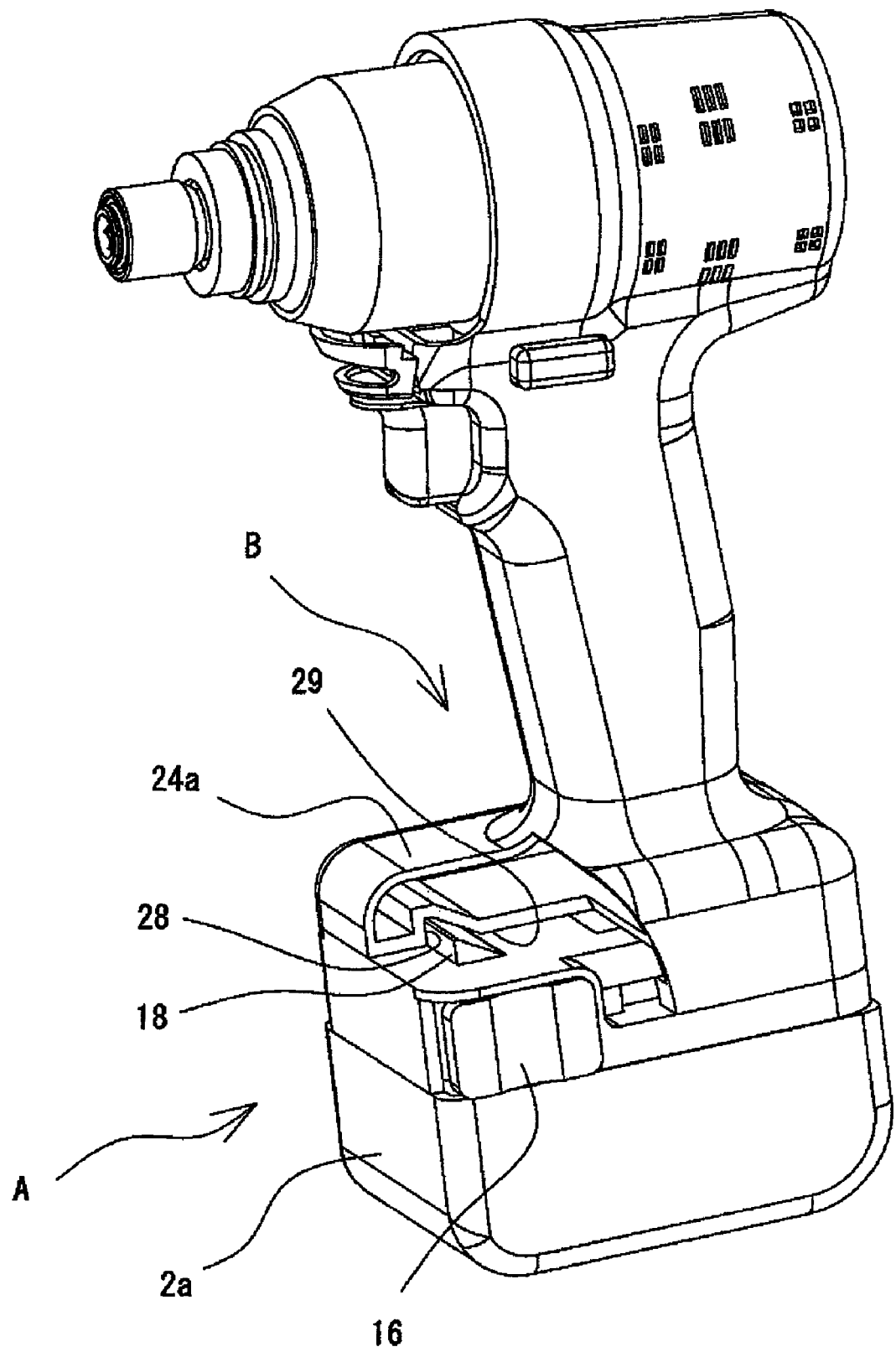
FIG. 3 is a cut-away view showing a locking part in FIG. 1.
Figure 4A:
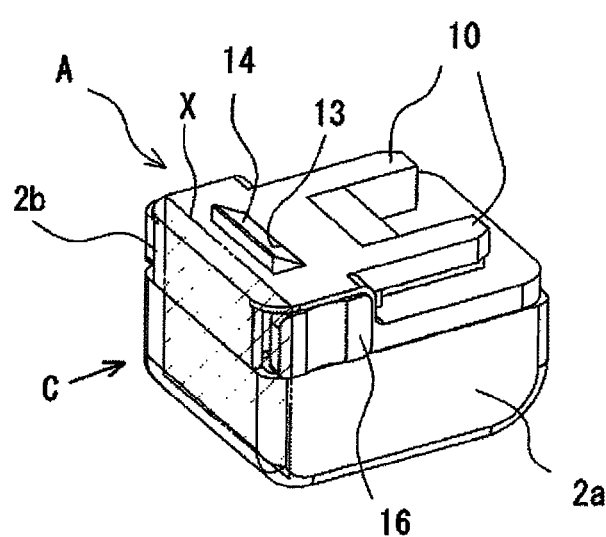
FIG. 4(a) is a perspective view of the battery pack according to the invention, as seen from the front when it is attached to the electric tool.
Figure 4B:
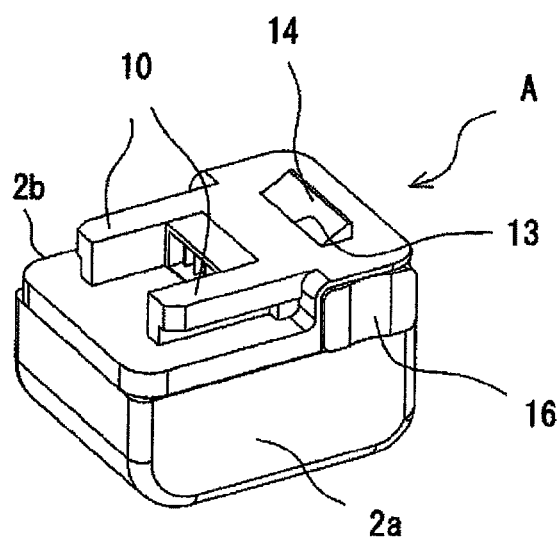
FIG. 4(b) is a perspective view of the battery pack according to the invention, as seen from the back when it is attached to the electric tool.
Figure 5:
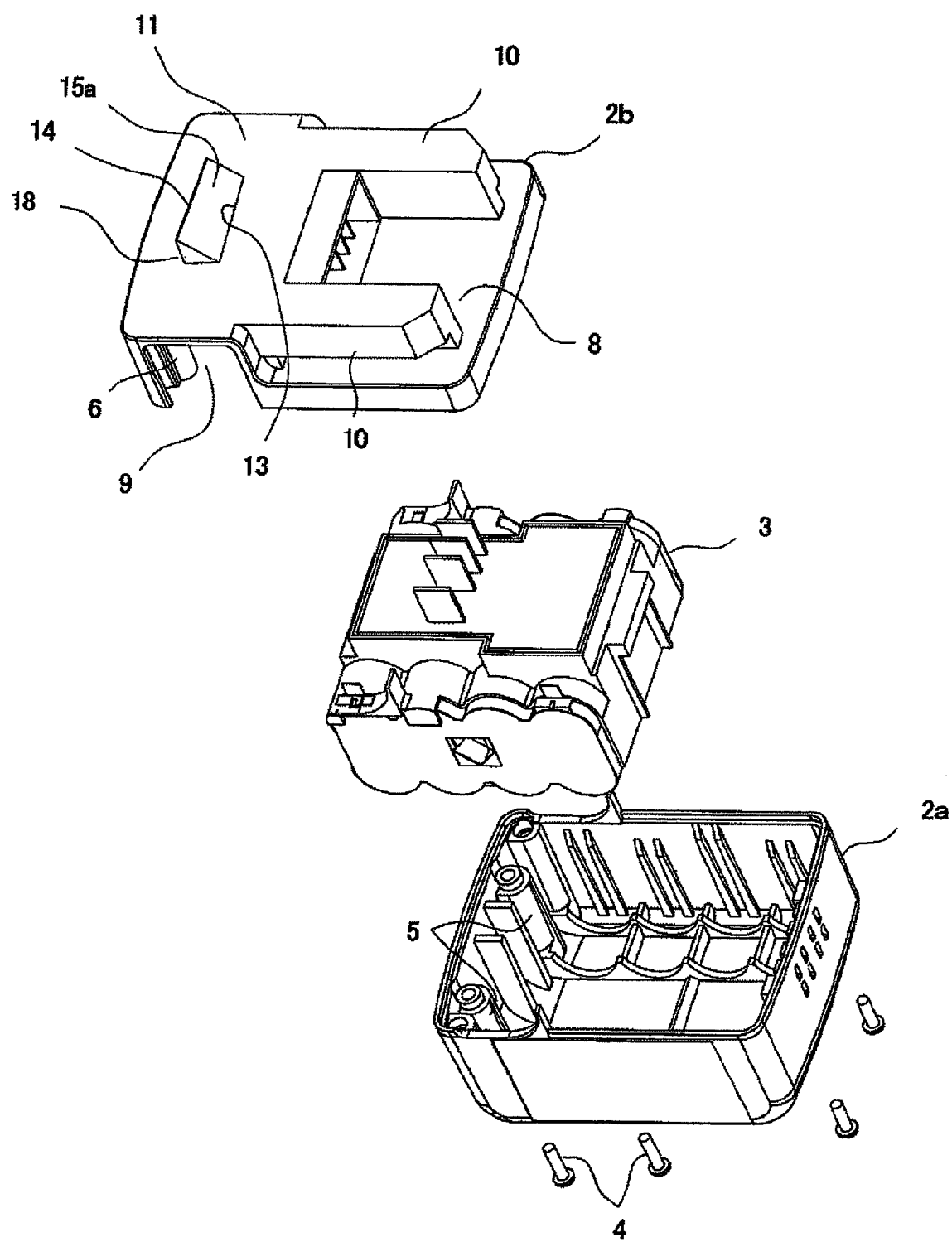
FIG. 5 is an exploded perspective view of the battery pack according to the invention.
Figure 6:
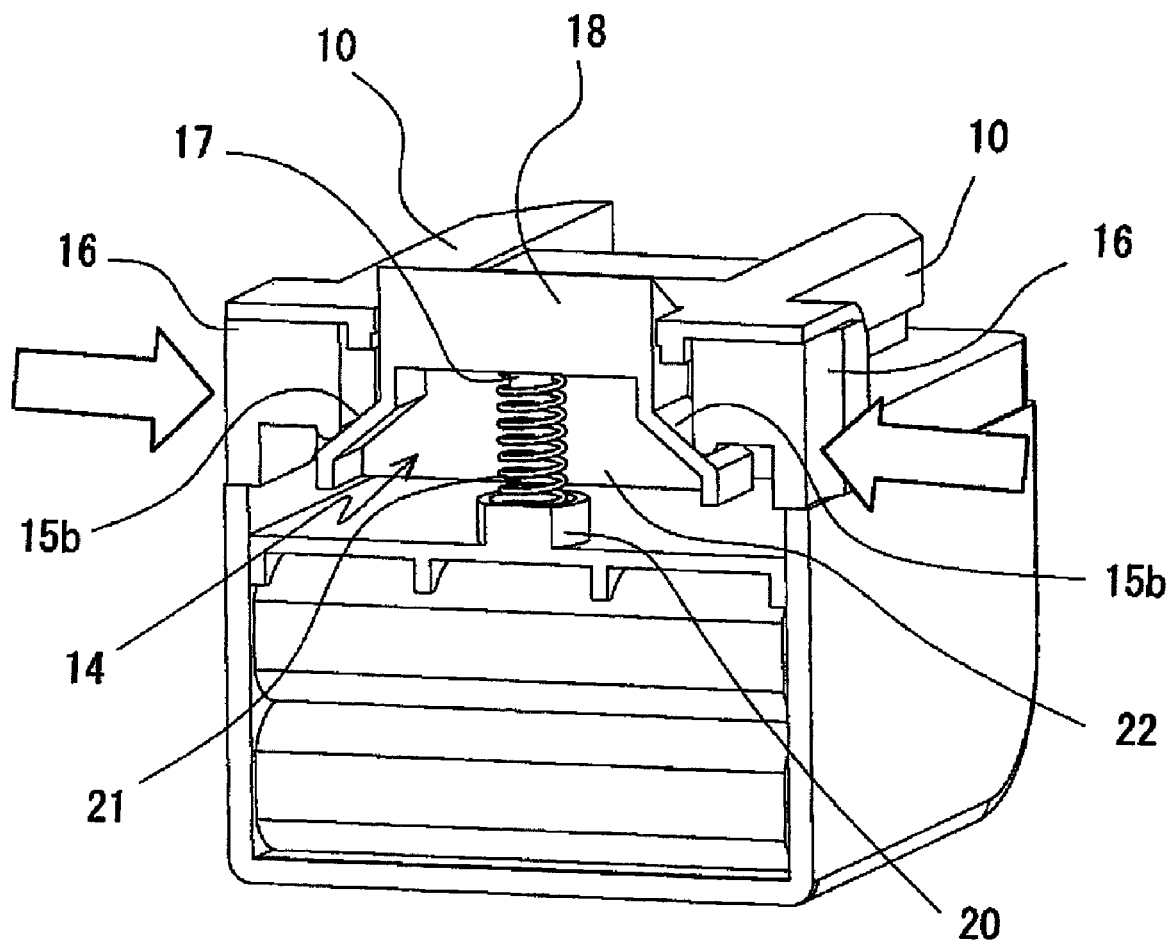
FIG. 6 is a perspective view partially in section taken at a section X in FIG. 4(a), as seen in a direction of an arrow mark C, showing relation between a locking member and operation parts.

FIG. 1 is a perspective view of a battery pack showing a state where the battery pack is attached to an electric tool, FIG. 2 is a perspective view of the battery pack showing a state before the battery pack is attached to the electric tool, FIG. 3 is a cut-away view showing a locking part in FIG. 1, FIG. 4(a) is a perspective view of the battery pack as seen from the front when it is attached to the electric tool, FIG. 4(b) is a perspective view of the battery pack as seen from the back when it is attached to the electric tool, FIG. 5 is an exploded perspective view of the battery pack, and FIG. 6 is a perspective view partially in section taken at a section X in FIG. 4(a), as seen in a direction of an arrow mark C.

In the drawings, sign A represents a battery pack, and sign B represents a mounting part which is provided in a lower part of a grip of an electric tool. As shown in FIG. 1, the battery pack A is slidably attached to the mounting part B of the electric tool so as to be attached and detached.

As shown in FIGS. 1, 4(a), 4(b), 5 and 6, the battery pack A includes an outer case 2 and an inner case 3. The outer case 2 includes a case body 2a in a shape of a box which is open at its upper end, and a lid member 2b for closing the open end. The inner case 3 is so constructed as to contain and retain eight batteries. The inner case 3 is received inside the outer case 2, after the batteries have been contained therein. Then, the lid member 2b is put on the inner case 3, and integrally coupled to the outer case 2, by inserting screws 4 into screw insertion pipes 5 inside the outer case 2 from below, to be screwed into screw receiving parts 6 which are formed at a back side of the lid member 2b.

By the way, the lid member 2b includes a lower plate 8, guide arms 10 provided at both sides on the lower plate 8, an upper plate 11 provided in rear of the guide arms 10, a back plate 12 which is formed downward from a backward end of the upper plate 11. An opening 13 is formed in the upper plate 11, and openings 9 are formed in both side faces of the upper plate 11.

A hook 14 is provided inside the opening 13 on the backward upper face. A locking jaw 18 adapted to be engaged with the mounting part B of the object equipment is formed in an upper end portion of the hook 14, and a first slanted face 15a adapted to be pushed down by the mounting part B of the object equipment at a time of attaching is formed on a front face of the locking jaw 18 in a sliding direction.

Second slanted faces 15b adapted to be engaged with operation parts 16 which are arranged inside the openings 9 are formed at both sides of a lower part of the hook 14, and a spring receiving part 17 is formed below an intermediate part of the hook 14.

The second slanted faces 15b and the screw receiving part 17 are arranged in a space 22 which is formed in front of the back plate 12. The second slanted faces 15b are engaged with respective one ends of the operation parts 16 and urged upward by a compression spring 21 which is provided between the spring receiving part 17 and a spring receiving part 20 formed on an upper face of the inner case 3.

In the above described structure, the hook 14 is urged upward. When the operation parts 16 are pushed inward, the second slanted faces 15b are moved downward in association, which enables the entire hook 14 to move downward from the opening 13 to a position below the upper plate 11.

It is to be noted that the battery pack A has such a size that it can be grasped with a single hand, and the operation parts 16 at the both sides are formed within such a range that they can be grasped with a single hand from both sides of the back face.

On the other hand, the mounting part B of the battery pack A is formed in a lower end part of the electric tool. As shown in FIG. 2, this mounting part B includes a base 24 and side pieces 25 which are formed at both sides below the base 24. The side pieces 25 are provided with guide ribs 26 on inner faces of lower parts thereof, and slide grooves 27 are respectively formed between the base 24 and the guide ribs 26 so that the guide arms 10 of the battery pack A can slide in the slide grooves 27. Moreover, a height of the guide ribs 26 is formed to such extent that the ribs 26 can be slidably engaged with grooves 23 between the lower plate 8 of the battery pack A and the guide arms 10.

On a back face of the base 24 opposite to its distal end portion 24a, there is provided an engaging groove 28 which is adapted to be engaged with the hook 14 of the battery pack A, and a flat part 29 is formed in front and in rear of the engaging groove 28 (See FIG. 3).

Then, for attaching the battery pack A to the mounting part B of the electric tool, the guide arms 10 of the battery pack A are slid into the slide grooves 27 of the mounting part B to be pushed therein, as shown in FIG. 2. On this occasion, the guide ribs 26 of the mounting part B are simultaneously engaged with the grooves 23. When the battery pack A has been pushed in and slid to the deep end, the locking jaw 18 of the hook 14 of the battery pack A enters into the locking groove 28 of the mounting part B to be locked by means of the compression spring 21 (See FIG. 6), whereby the battery pack A can be reliably attached to the mounting part B.

On the other hand, for detaching the battery pack A which has been attached to the mounting part B, the battery pack A is grasped with a single hand from the back with fingers extended forward, as shown in FIG. 1, and the operation parts 16 at the both sides are pressed inward so as to be clamped from both sides.

With this operation, the second slanted faces 15b of the hook 14 are pushed down by the operation parts 16, and the locking jaw 18 moves downward to be released from the lock to the locking groove 28 (See FIGS. 3 and 6). Then, in this state, the battery pack A may be slid in an opposite direction thereby to be detached from the mounting part B of the electric tool.

As described above, when the battery pack A is attached to the electric tool, it would be sufficient to slide the battery pack A to the mounting part B of the electric tool, and when the battery pack A is detached, it would be sufficient to press the operation parts 16 with the single hand so as to be clamped inward from the both sides, and to withdraw the battery pack A in this state, by sliding.

The operation parts 16 are arranged in both side parts of the case within such a range that they can be grasped with a single hand from both sides of a backward end in a sliding direction of the case. Therefore, when the battery pack A is detached, the case is rigidly clamped with the single hand as shown in FIG. 1, which is an act of rigidly holding the case in the single hand, at the same time. Besides, when the operation parts 16 are pushed in, the fingers can be easily engaged with the openings 9 as shown in FIG. 5, according to the action. In this manner, releasing the lock of the hook 14 and rigidly grasping the case for withdrawal are the same action, and therefore, it is possible to easily and reliably withdraw the battery pack A from the object equipment. Consequently, such an accident that the battery pack A may drop from the hand during attaching or detaching the battery pack A can be advantageously prevented.

As described above, the second slanted faces 15b are integrally formed with the hook 14, and kept in contact with the operation parts 16 during attaching the battery pack A. Therefore, it is possible to smoothly perform a series of motions that the operation parts 16 are pressed inward, and that in a state where the second slanted faces 15b and the locking jaw 18 of the hook 14 have disappeared from the opening 13, the battery pack A is slid to be withdrawn from the mounting part B of the tool body. As the results, operation performance is enhanced.

Further, as compared with small locking jaws which are formed on side faces of the hook at a front end thereof as in the case where the hook is formed on a side face of the battery pack A, it is possible to form the locking jaw 18 in a sufficiently large size, because the locking jaw 18 is formed at a full width of the front end of the hook 14 which is arranged on the upper plate 11 which is less restricted in view of space. Therefore, the locking jaw 18 has a large locking strength, and hence, it is possible to favorably prevent the battery pack A from being broken when it drops.

Still further, although the compression spring 21 is provided as an elastic body in the above described exemplary embodiment, other material such as rubber may be employed as the elastic body, instead of the spring.

Still further, although the locking mechanism is so constructed that the operation parts are pressed inward to unlock the hook in the above described exemplary embodiment, the operation parts may be provided with taper faces for example, and the hook may be unlocked by sliding.

Although the invention has been fully described referring to the specified embodiment, it is apparent to those skilled in the art that various modifications and amendments can be added without departing from sprit and scope of the invention.

This application is based on Japanese Patent Application which was filed on Jan. 12, 2006 (Japanese Patent Application No. 2006-04851), the contents of which are hereby incorporated by reference.

INDUSTRIAL APPLICABILITY

The object equipment of the invention is not limited to the electric tool, but the invention can be also applied to a battery charger for charging a battery pack, as the object equipment.

The invention claimed is:

1. A locking mechanism of a battery pack comprising:
a hook provided on a case which contains a battery and is attachable to and detachable from an object equipment by sliding, the hook being able to be locked to a mounting part of the object equipment; and
operation parts for releasing lock which are linked to the hook,
wherein the mounting part is provided on a bottom face of the object equipment, and the hook is provided on an upper face of the battery pack,
the hook is urged toward a grip of the object equipment by an elastic body to be locked to the mounting part,
the operation parts are arranged at both sides of a backward end part in a sliding direction of the case, the operation parts being configured to move laterally inward toward each other from a first position to a second position, and
the operation parts are operated from both sides, whereby the lock between the hook and the mounting part is released against the urge by the elastic body in the second position,
wherein a first slanted face is formed on the hook at a front face in the sliding direction of the case and can be engaged with the mounting part of the object equipment,
wherein second slanted faces are foamed on both sides of the hook and slant toward respective operating parts, and
in the second position, the operation parts are engaged with and directly contact the second slanted faces to push the second slanted faces, and the hook is moved away from the grip of the object equipment and released from the mounting part.

2. The locking mechanism of a battery pack according to claim 1, wherein the operation parts are operated by grasping them with a single hand from both sides.

* * * * *